Figure 1:
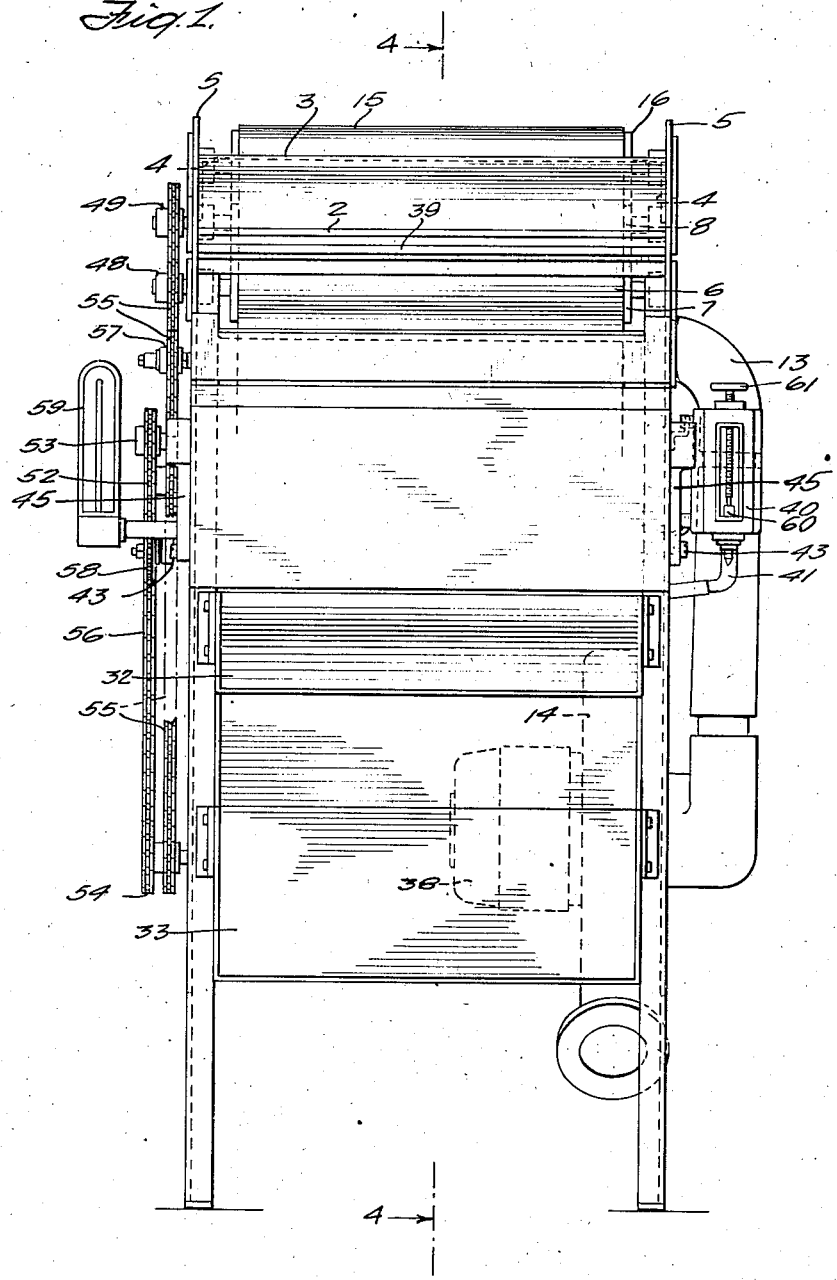

Aug. 11, 1942.  J. HORN  2,292,521
APPARATUS FOR MAKING PHOTOGRAPHIC COPIES
Filed July 6, 1938  4 Sheets-Sheet 1

INVENTOR
JOSEF HORN
BY
HIS ATTORNEYS

Aug. 11, 1942.                    J. HORN                    2,292,521
                  APPARATUS FOR MAKING PHOTOGRAPHIC COPIES
                            Filed July 6, 1938              4 Sheets-Sheet 3

INVENTOR
JOSEF HORN
BY
HIS ATTORNEYS

Aug. 11, 1942.  J. HORN  2,292,521
APPARATUS FOR MAKING PHOTOGRAPHIC COPIES
Filed July 6, 1938  4 Sheets-Sheet 4

INVENTOR
JOSEF HORN
BY
HIS ATTORNEYS

Patented Aug. 11, 1942

2,292,521

UNITED STATES PATENT OFFICE 2,292,521

APPARATUS FOR MAKING PHOTOGRAPHIC COPIES

Josef Horn, Wiesbaden-Biebrich, Germany, assignor, by mesne assignments, to Helge Svenson, Goteborg, Sweden Application July 6, 1938, Serial No. 217,659
In Germany July 19, 1937

4 Claims. (Cl. 271—74)

The invention relates to a device for making photo copies, particularly for a device suitable for the preparation of diazo types. By means of the new device both the lighting or exposure and the developing processes can be carried out in one working operation.

One object of the invention is an apparatus for the exposure of light sensitive material. Another object of the invention is an apparatus for the development of the exposed material. A further object of the invention is a suction table over which runs a porous transport or conveyor band. This suction table is so arranged that the appertaining transport band conveys the copies leaving the exposure apparatus to the developing apparatus. The exposure apparatus is preferably provided in the usual manner with a band conveyor. In that case the same transport band may be used also for the suction table, the latter being suitably arranged for this purpose.

Another object of the invention is a second suction table over which too a porous transport band runs. This suction table is used for the separation of the original from the copy adhering to the first mentioned suction table and for carrying away the original. As the copy and the original usually adhere to one another rather strongly owing to the occurrence of electric forces, a fairly considerable force is required for the separation. The second suction table is preferably so arranged that the suction surfaces of the two tables face one another, the tables being so arranged at an angle as to converge towards one another in the form of an arrow. The point of the arrow should then be arranged close to the point at which the copy and the original leave the exposure apparatus. Instead of separating the original from the copy by suction, other means can be used for the separation of the original from the copy, for instance compressed air or other gas may be blown between the two. In consequence of this a further object of the invention is an air blast nozzle arranged in the vicinity of the suction table, which acts upon the copy, in such a manner that the air jet issuing from the nozzle is blown against an edge, and preferably the leading edge of the copy (in the direction of movement of the copy). The suction table is then preferably so arranged that the original detached from the copy, can freely fall down under the action of gravity. The nozzle referred to is preferably provided with a discharge slot which extends over the whole width of the suction table. It is advisable to arrange the nozzle turnably. For controlling the air blast a throttle valve or flap may be used. It is preferred to employ the same fan or like device for supplying the blast air to the nozzle and for suction in the suction table.

Another object of the invention is a rotating circular brush which rotates oppositely to the direction of movement of the copy, and sweeps the copy with its brushes. This brush may be used instead of the nozzle referred to.

A particularly reliable separation of copy from the original may be attained by combining the above described methods and using in addition to a second suction table, an air blast nozzle and/or rotating brush.

Other objects of the invention will be seen from the following description.

Figure 2:
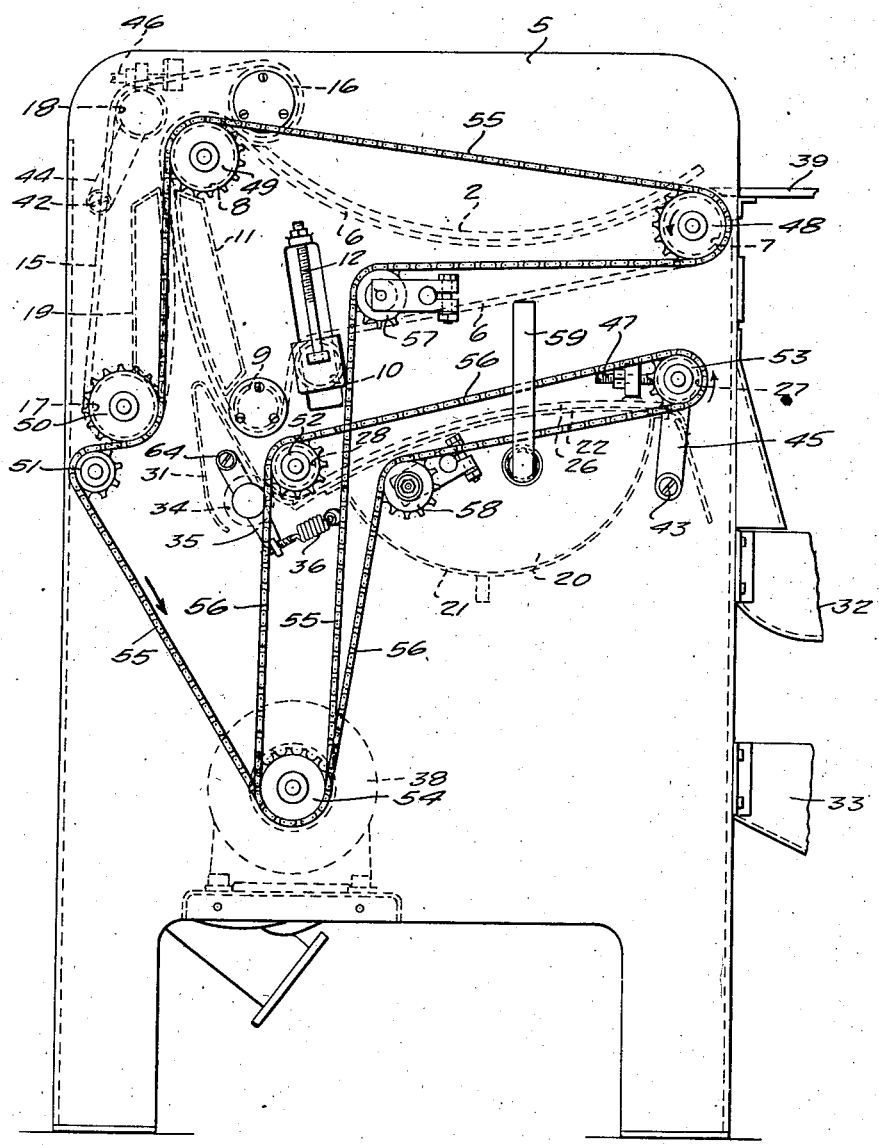
Figure 3:
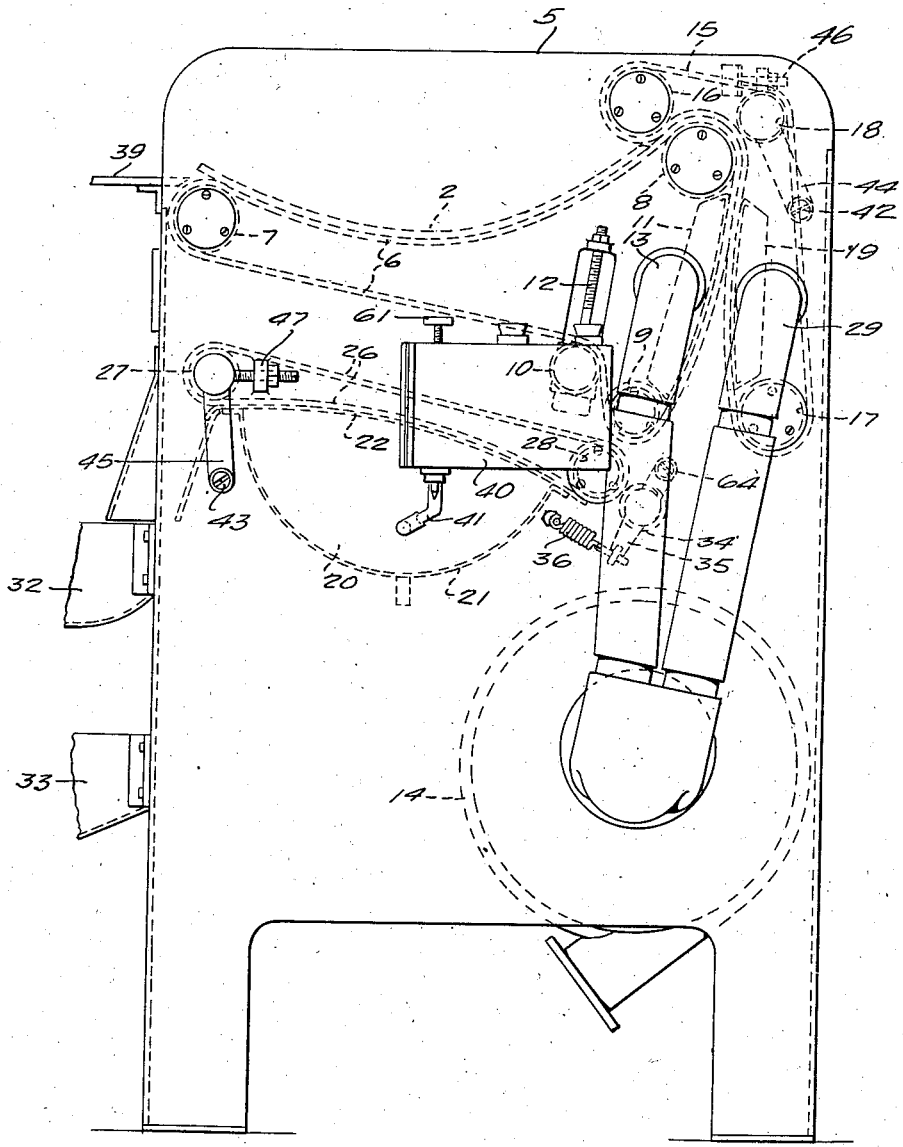
Figure 4:
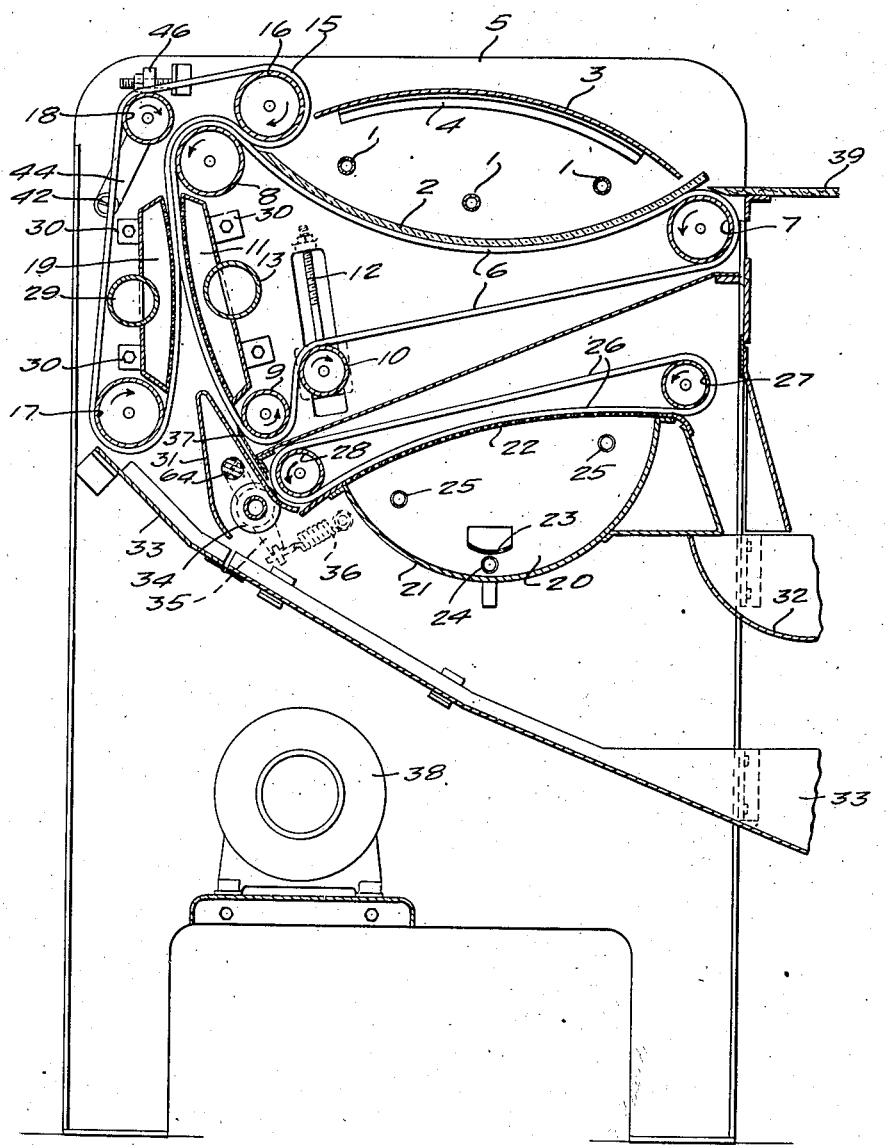

A constructional form of the invention is illustrated by way of example in the accompanying drawings. Fig. 1 is a front elevation of the apparatus. Figs. 2 and 3 are two side elevations. Fig. 4 is a section on line 4—4 of Fig. 1. The modification shown and described specifically is, however, not intended to in any way limit the scope of applicant's invention.

In the drawings the numeral 1 (Fig. 4) indicates sources of light, for instance arc lamps or mercury vapour lamps. The light emitted by these sources falls upon a bent glass plate 2. A reflector 3 is fixed by means of an angle iron 4 to a casing wall 5. A porous transport band 6 runs over guide rollers 7, 8 and 9, a tension roller 10 and a suction table 11, and is pressed against the glass plate 2. The band may, for instance, be made of felt or a finely perforated rubber band. Tensioning device 12 is of the usual construction. The suction table 11 which is preferably provided with a slightly convex suction surface, is also constructed in the usual manner. It consists substantially of a sheet iron box, the operative side of which is perforated. The interior of the box is connected by means of a duct 13 with a fan 14 or other suction producing device. Another porous transport band 15 runs over rollers 16 and 17, tensioning roller 18 and a second suction table 19, and is pressed upon a part of its path against the transport band 6. The suction table 19 is connected by means of a pipe 29 with the suction device 14. The numeral 30 indicates means for fixing the suction tables. A developing apparatus 20 comprises as an essential part a developer chamber 21 with perforated top plate 22. An ammonia solution is evaporated by means of an electric heater 24 in a trough 23. The ammonia gas is further heated by heaters 25. The transport band 26 which runs over rollers 27 and 28, is pressed against the perforated top plate 22 of the ammonia container. The roller 27 is constructed as a tensioning roller. Instead of the illustrated developing device, any other suitable developer using developing gas or a developing liquid may, of course, be used if desired. The copy and original respectively are guided by guide members 31, 32 and 33 made, for instance, of sheet iron. A roller 34 is rotatably mounted upon lever 35 which is pivotally attached to shaft 64. This roller 34 is pressed by means of a tensioning device 36 against the transport band 26. A scraper 37 bears with its edge against the transport band 6. The various transport bands are driven by a motor 38.

A table 39 is provided for facilitating the insertion of the original and the copy into the apparatus. The developing gas is produced from a solution contained in a container 40. The solution is supplied by means of a pipe 41 to the trough 23. A valve 60 is provided with a set screw 61 by means of which the supply of the solution of the developing gas to the trough 23 can be regulated. The shafts of the tensioning rollers 18 and 27 are mounted upon levers 44 and 45 turnable about pivots 42 and 43 respectively. The rollers may be adjusted in known manner by means of setting devices 46 and 47 respectively. Sprocket wheels 48, 49, 50, 51, 52, 53 and 54 transmit drive from motor 38 to the rollers by means of chains 55 and 56 which are kept under tension by sprocket wheels 57 and 58, respectively. The temperature of the developing gas is indicated by a thermometer 59.

The mode of operation of the described apparatus is as follows: The light sensitive paper and the original from which a copy is to be produced, are placed upon the table 39. The introduction of the copying paper and original into the exposure device takes place at the point A. The copy and the original are then moved forward between the glass plate 2 and the transport band 6, exposure taking place at the same time. At the point B exposure is completed. Copy and original move from this point, further between the transport bands 6 and 15. Underneath the roller 8 separation of copy and original is effected by the action of the suction tables. The original is carried away by the band 15 and drops upon the delivery plate 33 upon which it slides to the point D leaving then the apparatus. The copy is further transported by the transport band 6 and travels guided by the guide member 37 to the developing machine. After passing through the developing machine, the finished copy drops into a chute constituted by the guide member 32, from which it is taken away. Preferably the suction force of the suction table 11 should be greater than that of the suction table 19, to enable the copy, which, in practice, projects beyond the original, to be sucked in a reliable manner by the suction table 11. The suction forces of both tables may be regulated by built-in throttle valves or other means.

I claim:

1. In a machine for printing and developing photo copies, a device for separating the original from the exposed copy which comprises a suction table, a porous conveyor adapted to transport the exposed copy over said suction table, a further suction table and a porous transport band in combination with this suction table, the last-mentioned suction table being so arranged that it is capable of separating the original from the copy acted upon by the first mentioned suction table.

2. A device according to claim 1 wherein the suction table which acts upon the photo copy has greater suction power than the suction table acting upon the original.

3. In a machine for printing and developing photo copies, a device for separating the original from the exposed copy which comprises a suction table, a porous conveyor adapted to transport the exposed copy over said suction table, a further suction table and a porous transport band in combination with this suction table, the last-mentioned suction table being so arranged that the tables converge like a V at the point where they first come into contact with the photo copy or the original respectively, the suction faces of the two suction tables facing one another.

4. A device according to claim 3 wherein the porous conveyors passing over the suction tables are of perforated rubber.

JOSEF HORN.